Aug. 31, 1943.    J. L. CLOUGH    2,328,055
RECORD SELECTING MECHANISM
Filed July 11, 1940    3 Sheets-Sheet 1

INVENTOR
JEROME L. CLOUGH
BY
Wheeler, Wheeler & Wheeler
ATTORNEYS.

Aug. 31, 1943.  J. L. CLOUGH  2,328,055
RECORD SELECTING MECHANISM
Filed July 11, 1940  3 Sheets-Sheet 2

INVENTOR
JEROME L. CLOUGH
BY
Wheeler, Wheeler & Wheeler
ATTORNEYS.

Aug. 31, 1943.     J. L. CLOUGH     2,328,055
RECORD SELECTING MECHANISM
Filed July 11, 1940     3 Sheets-Sheet 3

INVENTOR
JEROME I. CLOUGH
BY
Wheeler, Wheeler & Wheeler
ATTORNEYS

Patented Aug. 31, 1943

2,328,055

UNITED STATES PATENT OFFICE 2,328,055

RECORD SELECTING MECHANISM

Jerome L. Clough, Milwaukee, Wis.

Application July 11, 1940, Serial No. 344,922

26 Claims. (Cl. 129—2)

This invention relates to improvements in record selecting mechanisms.

Broadly it is the purpose of the invention to provide a novel, simple and compact means for storing thousands of records in limited space and making such records almost instantly available upon manipulation of electrical and mechanical means for bringing the desired records to a given station.

More particularly it is the object of the invention to provide flexible trays in which records may be stored (such trays being advantageous per se), and to connect such trays in the form of a belt which can be wound upon reels and delivered under automatic control to a selecting station where the contents of an entire tray may be made accessible to the operator. The trays hereinafter to be disclosed are adapted to receive for filing purposes any of the better known types of record cards and mounts, each tray holding a series of overlapping cards or mounts subject to individual or collective manipulation or replacement at the selecting station. In providing for the storage of such trays and their contained records in a belt wound upon reels, it is an important feature of the present invention to provide means for confining the cards or records to the trays during manipulation of the belt, and it is a further important feature that upon each of the reels upon which any given portion of the belt is alternatively receivable, such belt portion is always wound in the same direction, thus giving to the cards or records stored in the trays a predetermined initial curvature or set which assists in maintaining them in position within the trays during the operation of the belt.

It is a further object of the invention to provide a selection mechanism so devised that movement of a suitable control with respect to an index or scale of limited range will produce a correspondingly enlarged movement of the entire belt of trays to bring a selected tray into registry with the control station preferably at varying speeds and in either direction, according to the movement of the control member, the arrangement being such that a slow movement of the control member will produce a slow drive of the belt, (the control member being operated at a speed such that it will not overrun the slow speed control), while a more abrupt movement of the control member beyond the slow speed control segment and onto the high speed control segment will throw the belt into high speed operation toward a point corresponding to the point at which the control member is brought to rest, irrespective of the direction or distance.

It is another object of the invention to provide means for preventing the accidental operation of the belt when any of the cards or records are displaced from their normally overlapping nested position in the respective trays.

It is a further object of the invention to provide means whereby additional trays can be inserted or removed at will to lengthen or shorten the belt and to provide means for transmitting the stress of belt operation independently of the flexible trays which carry the records.

It is a further and important object of the invention to provide novel and improved means for controlling simultaneously, mechanically, and at least semi-positively, the drive to both the winding and unwinding reels on which the belt is stored, so that the motion of the unwinding reel is directly controlled without being transmitted through the belt or through the tensioning means which relieves the trays of strain, the direct transmission of motion between the reels being accomplished in a manner which compensates for the varying effective radius of the respective reels as the belt is wound or unwound.

Many other objects of the invention will be apparent to those skilled in the art upon examination of the following specification of the invention.

In the drawings.

Like parts are identified by the same reference characters throughout the several views.

A suitable housing which, according to the requirements, may take the form shown at 20 in Fig. 1, or that shown at 21 in Fig. 12, or any other desired shape, provides supports for the rotatable reels 22 and 23 upon which the record belt hereinafter to be described may be stored. In the construction shown in Fig. 1, reel 22 is vertically above reel 23. In the construction shown in Fig. 12 the reels are at the same level. Any other arrangement is practicable.

Figure 9:
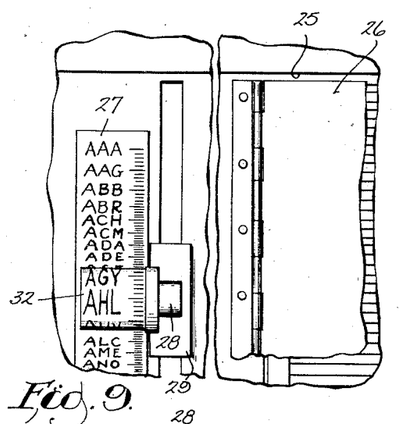
Fig. 9 is a detail view in plan, and Fig. 10 a detail view in cross section, showing a fragmentary portion of the control station.
Figure 10:
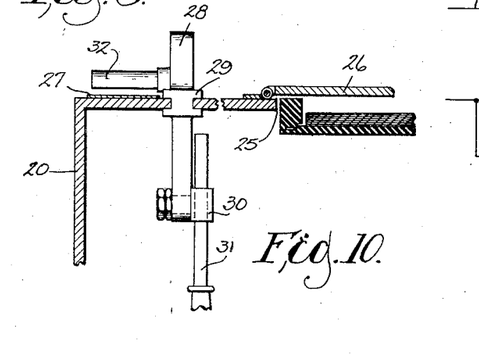

At the control station shown in detail in Figs. 9 and 10 the housing is provided with an aperture or window at 25 in which a substantial length, and preferably the full width, of the conveyor belt is exposed. If desired, this opening may be temporarily closed during the movement of the belt by a closure 26 hinged to permit it to be raised out of the way when inspection or manipulation of the records is desired. Immediately adjacent the window and preferably at the left thereof, I provide an index scale 27 with respect to which the control member 28 is adjustable. In the particular device shown in Figs. 1 to 11 this control member is mounted on a slide 29 for reciprocal movement, such movement being transmitted through the sliding swivel connection 30 to a lever 31 connected to selector mechanism hereinafter to be described. A magnifying glass 32 may be mounted on control member 28 if desired. By means of the selection and control mechanism hereinafter to be described the operator may move the control member into registry with any portion of the index scale and the record conveyor will instantly and automatically be set in motion to bring into registry with the window 25 the selected set of cards to which the given portion of the index scale relates.

Figures 2, 3, 4, 5, 6:
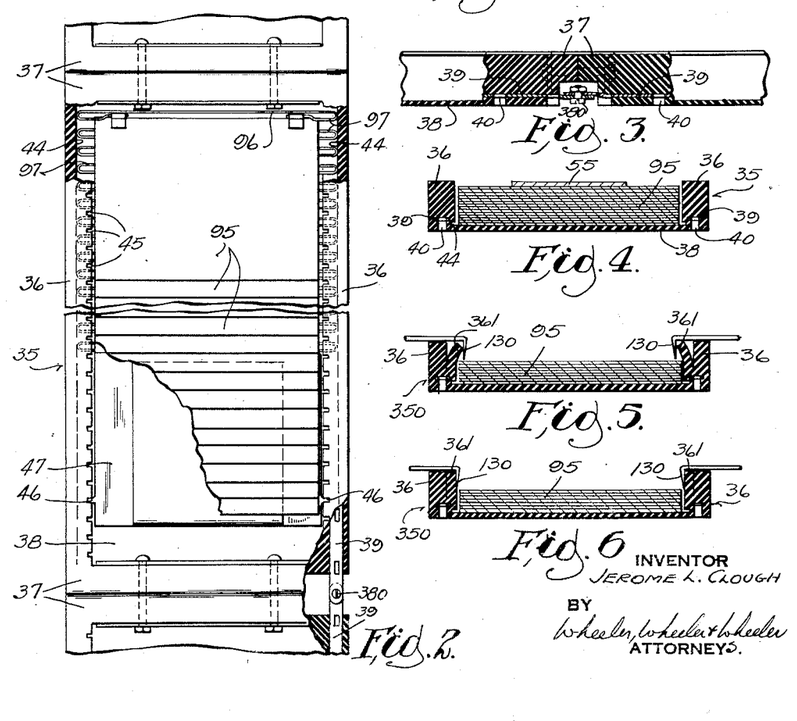
Fig. 2 is an enlarged detail view in plan showing flexible trays constituting the belt, the conveyor of my apparatus, and the records stored in overlapping positions therein.
Fig. 3 is a fragmentary detail view of the joint between two consecutive flexible trays.
Fig. 4 is a detail view showing a tray in cross section.
Figs. 5 and 6 are detail views similar to Fig. 4 showing a modified type of tray.
Figure 7:
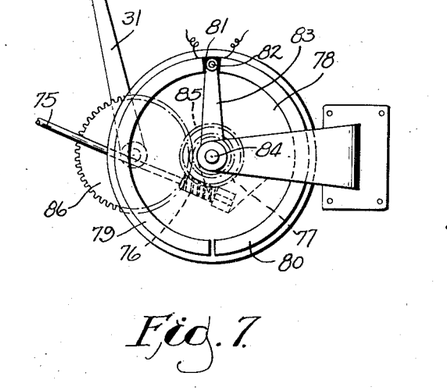
Fig. 7 is a detail view in side elevation, and Fig. 8 a detail view in section, of the improved selector mechanism constituting a part of my invention.
Figure 8:
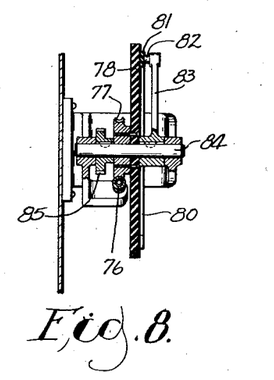

For the record conveyor I have devised a flexible tray 35 which is shown in detail in Figs. 2 to 4. There are available on the market numerous types of record cards and record carriers adapted for overlapping disposition in metal-tray cabinets. A neat feature of the present tray consists in the fact that it is adapted universally to receive any and all of these well known types of cards and record mounts and to store them operatively in positions for use. The flexibility of the tray not only adapts it for use as a conveyor in the device herein disclosed, but also facilitates the insertion and removal of cards and records singly and in groups, as desired.

Each of the trays 35 is preferably molded individually to comprise relatively heavy side and end walls 36 and 37 respectively and the flexible bottom 38 which may be reinforced if desired, though reinforcing is unnecessary. The end wall portions 37 of successive trays are in substantial abutment in the conveyor but are relieved to provide recesses facilitating the connection (by means of bolts 380) of steel tapes 39 which may be of any desired length but which preferably correspond substantially in length to the respective trays and extend through channels therein as shown in Figs. 3 and 4. These steel tapes, which may conveniently be made of saw steel or the like, absorb all of the tension to which the trays would otherwise be subject when connected as a belt. The bottom surfaces of the side walls 36, and preferably also the registering portions of the tapes themselves, are apertured at 40 to receive the sprocket teeth 41 of the control reel 42 over which the conveyor operates.

While it is not essential that the individual trays be fastened in any manner to the tapes (the registering sprocket teeth tending to maintain the relative positions of the trays on the tapes), each tray may, if desired, be bolted or riveted or otherwise secured to the steel tapes which pass therethrough.

Each of the rubber trays is preferably provided with an undercut or channel 44 in the interior surface of its side walls 36 at or immediately above the upper surface of the tray bottom 38. Each tray also preferably has its side walls provided with a series of closely parallel and preferably uniformly spaced vertical channels at 45 (Fig. 2). The longitudinal channels 44 will receive practically any type of card mount adapted for tray filing and the notches 45 are adapted adjustably to receive the positioning fingers 46 of a follower and support 47 which may be moved from point to point in the tray when the tray contains less than its capacity of cards or records. An important feature of the invention lies in the fact that because of the flexibility of the tray the cards need not be inserted and removed singly in the channels 44. By bodily flexing the side wall of the tray it is possible to obtain access to a whole series of cards or records for simultaneous and bodily removal thereof from the tray.

A series of trays connected together to constitute a record conveyor in the manner already described, is wound on the reel or drum 23 and thence passes over the guide pulley 48 (Fig. 1) to sprocket 42 which has already been mentioned. Between the guide roll 48 and sprocket 42 the conveyor passes beneath the inspection opening or window 25, the length of which is preferably sufficient to expose at least one complete tray when such tray registers with the window.

After passing over sprocket 42 the record conveyor goes downwardly about the guide pulley 49 and thence about an idler 50 which is yieldably mounted on lever 51 and subject to the tension of a biasing spring 52 for taking up all the slack in the conveyor. The strength of the trays and respective steel tapes is such, and the strength of spring 52 is such, that no table or other support for the trays at the inspection window is required.

From the idling take-up pulley 50 the conveyor passes directly to the other reel 22 about which it is wound in the same direction of curvature so that the overlapping cards or records stored within the trays and wound on one or the other of these reels will take a curvature or set which, while slight, is of advantage during the movement of the conveyor, and which will not be disturbed when the conveyor is wound on the other reel, the arc being the same in each instance for the reason that the lower side of each tray in the conveyor is always innermost, and the top side of each tray of the conveyor is always outermost.

Except when the trays are passing beneath the inspection window, the cards are securely bound therein through the use of two separate aprons 55 and 56. That portion of apron 55 which is not in use is wound on a torsion spring reel 57, comparable to an ordinary shade roller except that it has no detents and acts at all times to take up the slack in the apron 55. Apron 55 passes from the reel about a guide pulley 58 which is located immediately adjacent the window aperture 25 and thence the apron passes with the conveyor as a superimposed separate ply thereof about the reel or drum 23. While the records are wound upon drum 23 and also after they leave the drum en route toward the window 25, the apron 55 is virtually a part of the conveyor pressing the records collectively into their respective trays and resting directly on the records as shown in Fig. 4. Not until the apron is stripped from the records after passing about the pulley 58 en route to the take-up roller 57, are the records exposed at window 25. Such records as do not stop in registry with window 25 continue beyond the window beneath the guide pulley 59 about which apron 56 operates. Before the conveyor changes its direction in passing over sprocket 42, the apron 56 engages the upper surfaces of the cards or other records carried by the conveyor to hold such cards or records firmly in their respective trays during the continued movement of the trays as a part of the conveyor toward reel 22. For convenience the torsion spring roller 60 upon which the surplus portion of apron 56 is wound, is located at the rear of the cabinet 20, though any other convenient location would be acceptable. Between the take-up roll 60 and the guide pulley 59, the apron 56 passes about idler pulleys 61, 62, and 63, which are located as needed at the corners of the cabinet.

As the conveyor reels 22 and 23 operate in one direction or the other, the covering aprons 55 and 56 will be paid out or taken up by their respective torsion rolls 57 and 60 to maintain the contents of the successive trays constituting the conveyor covered and closely confined to the trays at all points in the course of conveyor movement except at the inspection window 25 where the trays pass from beneath one of the aprons and are momentarily exposed before being engaged beneath another of the aprons.

Figure 1:
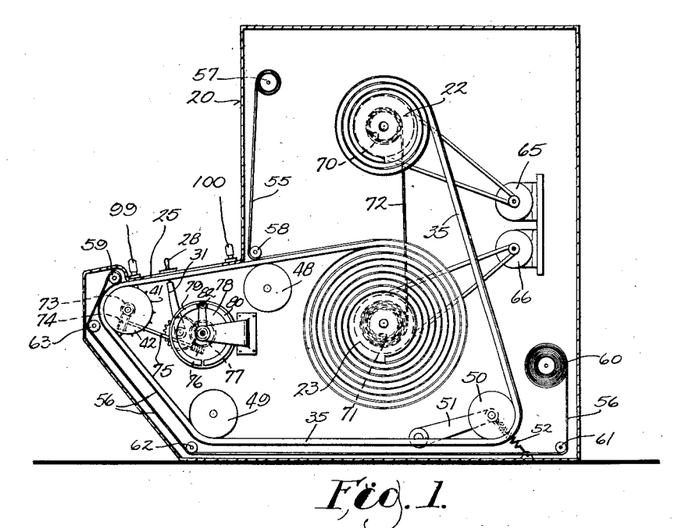
Fig. 1 is a view in transverse cross section through apparatus embodying the invention.
Figure 11:
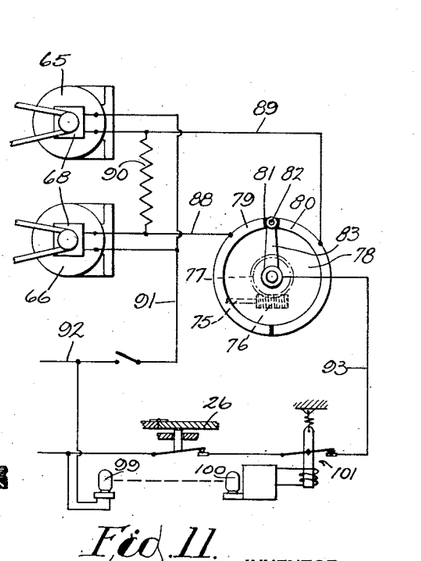
Fig. 11 is a detail view of the control circuit of the selector mechanism.

In the device shown in Fig. 1 and the circuit diagrammatically illustrated in Fig. 11, two separate motors are employed to drive the respective reels 22 and 23. The motor 65 is directly belted to reel 22 while the motor 66 is directly belted to the reel 23. These motors are arranged to turn their respective reels in opposite directions and are operable at a power differential which may favor either motor according to which reel is to do the winding. The lower power of the other motor opposes unwinding of the conveyor from the other reel, thus serving as a convenient means of non-mechanically providing against the overrun of a reel from which the conveyor is being withdrawn. Moreover, each motor is preferably individually provided with its own brake, electromagnetically controlled. The brakes are illustrated diagrammatically at 68 in Fig. 11. Several types of brakes connected in parallel or series with electric motors to be operated when the current to the motor is cut off, are known to the art, an example being the device shown in Patent No. 2,059,244.

The control circuit hereinafter disclosed is such that the energizing of either motor in a direction of rotation to take up the conveyor on the reel to which such motor is connected, will automatically release the brakes on both motors but will apply current through a resistance to the other motor to offer sufficient electrical opposition to the withdrawal of the conveyor from the other reel so as to prevent overrun. As soon as the current is cut off from the positively propelled motor the brakes will be applied to both motors, thereby bringing both of the reels immediately to rest.

Since in any operation of either of the motors 65 or 66, the two motors will be energized in opposition to each other, the conveyor would necessarily be subjected to considerable tension but for the provision of means for transmitting the power of the more strongly energized motor directly from the winding reel driven thereby to the unwinding reel which is resisted by the less strongly energized motor. For this purpose reel 22 is provided with a spool 70 and reel 23 with a spool 71. Upon these spools is spirally wound a flexible tension member 72 which, in some embodiments of the invention, may take the form of a steel tape, but which here, because of the thickness of the trays 35 comprising the conveyor, is preferably a chain. Whatever the nature of the flexible tension member 72, the effective radii of the spools 70 and 71 is preferably proportioned to the effective radii of the drums 22 and 23 in the same proportion as the thickness of the tension member 22 to the thickness of the conveyor belt with its superposed retaining apron 55 or 56, assuming the apron to be used in a given installation. By reason of this arrangement the relative rate of winding or unwinding of the tension member on the respective drums will correspond to the relative rate of winding and unwinding of the conveyor thereon, since the effective radius of the spools in the course of the winding and unwinding of the tension member will vary in the same proportion as the effective radius of the drums will vary due to the winding and unwinding of the conveyor. Thus motion will be transmitted positively at all times from the drum which is winding to the drum which is unwinding, and the conveyor will thus be delivered from the unwinding drum at the same rate at which it is wound on the winding drum without the entire tension of the winding drum being transmitted through the conveyor itself.

The energization of the motors to move the conveyor in accordance with the operation of the control member respecting its index is preferably accomplished by a device in which a commutator member having two segments and a brush member engageable therewith are associated for relative movement, one of said members being connected to operate in accordance with the movement of the conveyor and the other being connected to operate in accordance with the movement of the control member.

In the particular arrangement disclosed in Fig. 1 the sprocket 42 carries a worm 73 meshing with a worm wheel 74 on a shaft 75 which, through worm 76 and worm wheel 77, drives the commutator disk 78. The disk 78 may be made of dielectric material. It carries two electrically conductive segments 79 and 80 which are spaced at 81 sufficiently to receive the entire width of brush 82 whereby said brush, when in registry with the dead spot 81, may be out of contact with either segment.

Brush 82 is mounted on an arm 83 carried by shaft 84 bearing a pinion 85 meshing with a rack gear 86 to which the control member 31 is connected. The rate reduction in the transmission of motion from the sprocket 42 to the commutator disk is so worked out with reference to the movement of the brush responsive to manipulation of control member 28 that the movement of the control member from one end of the index to the other will move the brush through an arc of less than 180 degrees, while a movement of the entire length of the conveyor over the sprocket 42 will occasion movement of the sprocket which, when reduced by the worm and worm gear sets will result in rotating the commutator disk through substantially the same arc.

As indicated diagrammatically in Fig. 11, the segment 79 is connected by conductor 88 to one of the terminals of motor 66. Segment 80 is connected by conductor 89 to one of the terminals of motor 65. Between the aforesaid terminals of motors 65 and 66 is a resistance element 90. The other terminals of the respective motors are connected by conductor 91 to a supply line 92, the other supply line 93 being connected to the brush 82.

As previously indicated, the brakes 68 are of such a nature as to be normally applied by springs therein contained. The brakes are released when electrically energized by the energization of the motors with which the brakes are associated. For this purpose the brakes may be connected in any desired manner in parallel or series with their respective motors or with the supply current.

From this diagram it will be apparent that if the parts are at rest the brush will lie between the segments 79 and 80 and no current will flow. If the operator desires to move the conveyor to a position which will expose cards or records related to a different portion of the index, the operator simply moves the control member 28 to register with the desired portion of the index. This will engage the brush 82 with one or the other of the segments 79 or 80.

Assuming that the brush is engaged with segment 79, current will flow from supply line 93 through the brush and through the segment 79 of the conductor 88 directly to motor 66, whereby said motor will be primarily energized with the full power furnished by the supply line. Some current, however, will flow through the resistance 90 to motor 65, whereby this motor will be secondarily energized at a reduced potential due to the intervening resistance 90. Since both motors are energized, both brakes will be released and the superior power of motor 66 will cause a winding rotation of reel 23 and spool 71 whereby the conveyor will be wound on reel 23 and the tension member will be wound at a corresponding rate on drum 71. The motion of the conveyor will be transmitted through sprocket 41 to the commutator disk 78 to turn the disk in a direction such as to tend to restore the dead spot 81 thereon into registration with the brush 82 at the new location of the brush. As soon as registration is effected current will again be cut off from segment 79 and the parts will come to rest.

Assuming that brush 82 is moved by manipulation of the control member 28 to contact with segment 80, the motor 65 will be primarily energized with the full power provided by lines 92 and 93 while the motor 66 will be energized at reduced power through resistance 90, thus causing drum or reel 22 to become the winding reel and reel 23 to become the unwinding reel. This will occasion an opposite movement of the conveyor with a consequent opposite rotation of the commutator disk which again will restore the dead spot 81 of the commutator disk to registration with the brush 82, thus interrupting all current flow as soon as the parts reach the desired position.

In this manner the operator can simply move his control member to the desired portion of the index and the machine will automatically move the conveyor in one direction or the other as necessary to expose at the window 25 the selected portion of the conveyor bearing the cards or records corresponding to the portion of the index with which the control member has been moved to register.

The particular records illustrated as being stored in the flexible trays 35 constituting the conveyor, are of a type in which record cards 95 are pivotally hinged on pintle wires 96 having end portions 97 projecting to be received in the undercut grooves or channels 44 of the flexible trays. When the operator has registered the desired tray with window 25, the operator may desire to lift one or more of these cards to obtain access to a card therebeneath for making a notation thereon or for the purpose of reading notations already present. Naturally, it is undesirable that the machine should be permitted to operate when any card or group of cards has been lifted in this manner, as the cards might catch in the margins of the frame about the window opening 25. Accordingly I prefer to provide an automatic control which will prevent operation of the machine under these circumstances, and for this purpose I may either equip the door 26 (if such door is used) with a control switch in one of the lines 92 or 93 to be closed only when the door is closed or, preferably, I may provide at 99 a pilot lamp which will be energized whenever the lines 92 and 93 are energized and the light of which will operate a photoelectric cell at 100 connected to a relay switch 101, the arrangement being such that the relay switch will remain closed as long as the light of the pilot lamp 99 continues to fall on the photoelectric cell 100, but will be opened to interrupt the current through one of the lines 92 or 93 to the motors whenever the passage of light is interrupted. Thus, whether one of the records is elevated in its tray, or whether the operator's hand is dangerously disposed in contact with the tray, the interruption of the beam of light between the lamp 99 and the photoelectric cell 100 will automatically preclude operation of the conveyor until the obstruction is removed.

Figure 12:
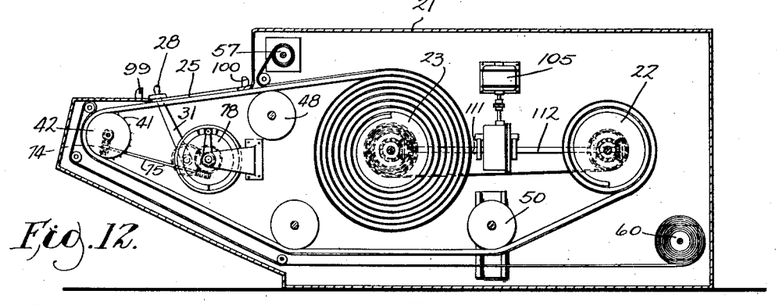
Fig. 12 is a view similar to Fig. 1 showing a modified apparatus embodying the invention.
Figure 13:
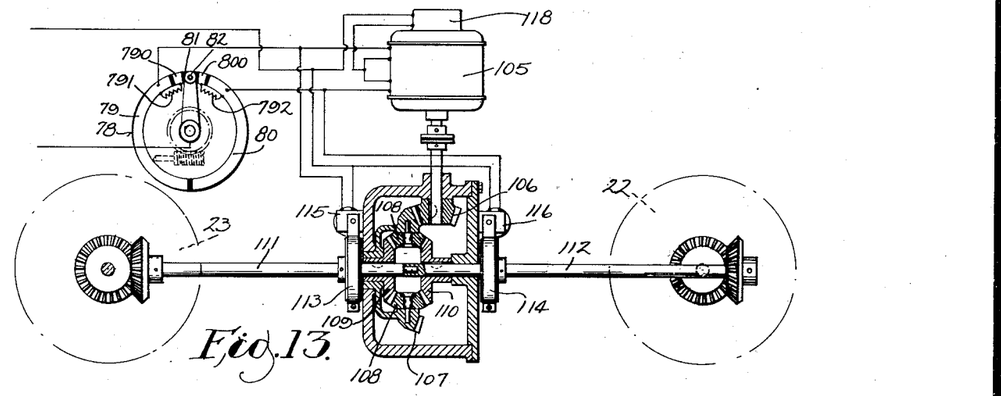
Fig. 13 is a diagrammatic plan view partly in section of the driving apparatus used in the device of Fig. 12 for selectively operating the respective reels.
Figure 14:
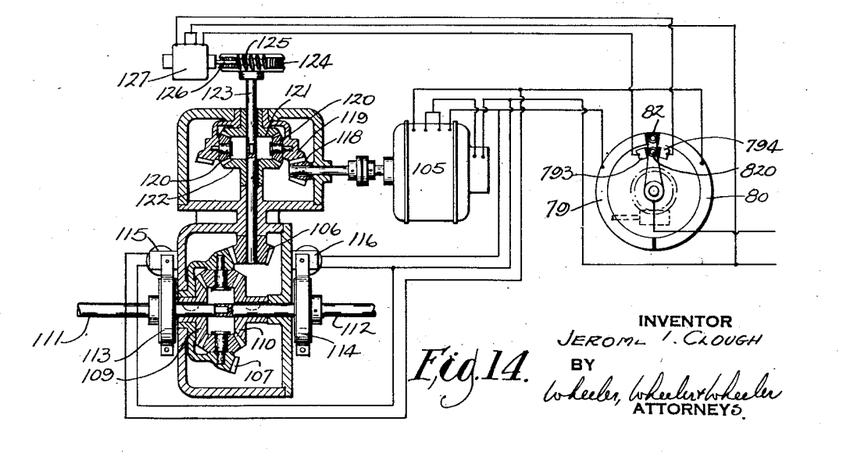
Fig. 14 is a diagrammatic view of an alternative driving apparatus for selectively actuating the respective reels.

In the construction disclosed in Figs. 12, 13 and 14, I have illustrated an embodiment of this invention in which a single motor 105 of a type which is reversible and may be operated at differing speeds, is connected to drive both of the drums 22 and 23 through differential gearing which permits the relative speed of rotation of the drums to vary according to the increasing and decreasing effective radius of the respective drums as the conveyor is wound on one of the drums and unwound from the other.

In this exemplification of the invention the motor 105 drives a pinion 106 meshing with the differential ring gear 107 which carries the differential pinions 108 intervening between the driven gears 109 and 110. The driven gear 109 is mounted on shaft 111, operatively connected to drum 23 while gear 110 is mounted on shaft 112 operatively connected to reel 22. The tensioning member 72 need not be present in this construction, the differential gearing being sufficient to provide compensation as between the respective drums. It is, however, necessary to ensure such compensation by slightly retarding the movement of the drum from which the conveyor is being unwound at any given time. Accordingly the shafts 111 and 112 connected to the respective reels, are provided with brakes of any desired electrical, hydraulic, pneumatic, or mechanical type as shown at 113 and 114 respectively. The brakes illustrated are mechanical in form but are electrically controlled by solenoids 115 and 116 so wired as to be energized according to the direction in which the motor 105 is operated. Like the motors previously described, motor 105 has its own brake for bringing the entire apparatus to rest on the conclusion of each operation, such brake being identified by reference character 118.

The arrangement disclosed is such that if the control member 28 is moved away from the operator toward the top of the index the brush 82 will be moved out of registry with the dead spot 81 of the commutator into engagement with segment 79. This will energize the motor 105 for rotation in its forward direction whereby reel 22 will be turned in a winding direction and reel 23 in an unwinding direction. Since it is desired that reel 22 be primarily actuated, and that reel 23 shall be controlled as to its movement secondarily in accordance with the rate at which the conveyor is to be unwound therefrom, the connection is such as to energize the solenoid 115 of brake 113 to impose a slight resistance on the rotation of shaft 111. The motor will continue in operation until the movement of the sprocket occasioned by the passage of the conveyor has adjusted the commutator disk 78 to a new position where the brush again registers with the dead spot on the disk, thus interrupting all flow of current to the motor.

Assuming that the control member 28 was moved in the opposite direction to engage the brush 82 with the commutator segment 80, the motor 105 would then have been energized to turn in its reverse direction of rotation, thereby winding on reel 23 and unwinding from reel 22. The armature 116 is now energized to apply brake 114 to cause very slight resistance to the rotation of shaft 112 to assure equalization of the relative movement of the two reels, accommodated by the differential through which the driving motion is effected.

By introducing short commutator segments 790 and 800 between the segments 79 and 80 and the dead spot 81, and by bridging the gaps between the respective segments by resistors 791 and 792, it is possible to arrange for the motor to be operated at a reduced speed in the initial and final relative movements of the brush and the commutator at the beginning and conclusion of each operation. Furthermore, it permits of minute adjustments of the conveyor when desired, since where the desired movement is only slight the motor will never be placed in high speed operation, the brush contacting only the short low speed segments 790 or 800 of the commutator. The present illustration of slow speed segments 790 and 800 is obviously intended to be merely illustrative of an arrangement whereby any desired number of speeds may be provided by multiplying the number of short segments and intervening resistances to build up and retard motor speeds at any desired rate at the starting and stopping of each operation.

In Fig. 14 I have disclosed a modified arrangement in which the motor 105 instead of directly driving the differential mechanism shown in Fig. 13, drives such mechanism through an intervening differential. In this construction the motor 105 drives a pinion 118 meshing with ring gear 119. This ring gear carries differential pinions 120 between driven gears 121 and 122, the latter being mounted on a shaft which drives pinion 106 of the same differential described in connection with Fig. 13 of the drawings.

Gear 121, however, is normally held stationary, being mounted on a shaft 123 which carries a worm gear 124 driven by a worm 125 connected with the armature shaft 126 of a reversible motor 127. The motor 105 has electrical connections to the segments 79 and 80 exactly as in the Fig. 13 construction but changes in rates of speed are accomplished in a different manner, subject to the control of a supplemental brush 820 operating between supplemental segments 793 and 794. It will be obvious that if motor 127 is not in operation, all of the motion derived from motor 105 will be transmitted to pinion 106 to drive the motion apportioning differential. However, insofar as motor 127 is in operation in one direction or the other to drive shaft 123, its motion will be added to or subtracted from the motion of motor 105. In the present arrangement, the construction being such that the two motors always operate in corresponding directions (either both forwardly or both in reverse), any motion produced by motor 127 will always be subtracted from the motion produced by motor 105, to operate the reels at a slower rate than the rate at which they are operated with motor 127 stationary.

Thus any relative displacement between the brush and the commutator will initially operate both motors either forwardly or in reverse, thus producing an initial slow speed of operation. If the relative displacement between the brushes and the commutator is sufficiently great in extent so that brush 820 runs beyond the appropriate segments 793 or 794, the motor 127 will thereupon discontinue its operation and the drive to the reels will be correspondingly speeded up in a direction such that the movement of the conveyor will ultimately bring the brushes back into registration with the dead spots on the commutator. Just before such registration wholly cuts off the current to the two motors, the brush 820 will contact the appropriate short segments 793 or 794 with the result of again initiating movement of motor 127, thereby gradually retarding the rate of operation of the reels as motor 127 gains in speed. Thus I have provided a different way of accomplishing the gradual increase of speed at the initiation of a selecting operation and a gradual retarding of speed at the conclusion of such operation.

There are various ways of holding the records or cards in the flexible trays constituting the conveyor belt without using the cover tapes or aprons 55 and 56. One mode of accomplishing this result is suggested in Figs. 5 and 6. The tray 350 illustrated in Figs. 5 and 6 is provided in its side walls 36 with vertical longitudinal slits and the portions 361 of the side walls which are disposed within the slits are so formed as to tend to lie permanently inclined inwardly, thus overlying and holding down the record cards 95 therein contained. Either the operator's fingers or the hook-shaped tools 130 may be used in the manner shown in Fig. 6 to retract the overhanging side wall portions 361, thereby leaving the card records 95 free.

As already intimated, the flexibility of the trays is also serviceable in facilitating the introduction and removal of whole sets of records collectively. Ordinarily records will be inserted and removed individually, but when it is desired to make a more substantial change in the records it is possible, by flexing the whole side wall of any of the trays herein disclosed, to open up the slot 44 and expose the wire pintle rods 97 which are normally anchored therein, whereby an entire set of such pintle rods and their associated records may be lifted out bodily in a manner not possible in any other record tray known to me.

It will be understood to be within my contemplation that the various features herein disclosed may be used individually or re-arranged or substituted as preferred. It will be obvious, for example, that the speed reducing means shown in Fig. 13 or in Fig. 14 might be incorporated in the device illustrated in Figs. 1 to 11.

In any device in which cards or like records are to be stored in overlapping positions in a flexible conveyor, it is of the utmost importance that the reels upon which the conveyor is wound be so disposed, as herein disclosed, that the curvature, set, or flexing of the cards is always in the same direction. Excessive movement of the overlapping cards or records upon each other will not only obliterate the notations on the cards, but will speedily destroy the cards. The fact that the curve or set of the cards in this apparatus is always in the same direction minimizes the motion and therefore preserves the records and the notations thereon.

I claim:

1. Filing apparatus comprising a series of like trays of elongated form having flexible side wall and bottom portions, and means connecting said trays end to end to constitute a conveyor, said means comprising tension elements extending longitudinally of the respective trays and operatively connected in tension transmitting relation to each other, whereby substantally to relieve the flexible portions of said trays from tension, each of said trays comprising a record file having record retainers extending transversely of the tray and removably interlocked therewith.

2. In a record storage device, the combination with supporting means providing a display station, of a plurality of reels, power means selectively operable for actuating said reels in either direction of rotation, a conveyor provided with means for supporting a series of overlapping records and connected at its ends to the respective reels to be wound alternatively thereon in successive layers, and means guiding said conveyor from one of said reels to the other of said reels past said display station, said guiding means defining a conveyor path between said reels such that said conveyor is wound with corresponding curvature upon both of said reels and without reverse curvature therebetween, whereby the overlapping records carried by said conveyor are maintained with a predetermined curvature or set.

3. In a device of the character described, the combination with supporting means providing a display station, of a plurality of reels mounted on said means, a conveyor comprising a series of record filing open trays with flexible upstanding sides, and means connecting said trays together end to end, the trays at the ends of said series being connected to the reels and said conveyor being wound about said reels with the same curvature and with the open sides of the trays outermost upon each reel, means for guiding said conveyor from one of said reels to the other of said reels past said display station upon a path such as to avoid reversal of said curvature.

4. A device of the character described, comprising the combination with a pair of reels and a conveyor wound upon said reels and extending therebetween, said conveyor having means for mounting records and a co-operating apron ply superimposed upon said conveyor and constituting a means for holding thereto the records mounted thereon, together with means for guiding said co-operating apron ply upon a path different from that of the conveyor for at least a portion of the movement of said conveyor between said reels.

5. In a device of the character described, the combination with a support providing a display station, of a plurality of reels mounted in said support, a record mounting conveyor provided with means for retaining overlapping records and wound upon said reels, means guiding said conveyor past said station between said reels, apron plies interwound between successive turns of said conveyor upon the respective reels and constituting means for holding the overlapping records securely to said conveyor, take-up rolls upon which the respective apron plies are wound, and guide means spaced at either side of said station about which said respective apron plies pass to their respective take-up rolls whereby the records are exposed between said apron plies at said station.

6. In a device of the character described, the combination with means providing a record display station, of spaced supports at either side of said station, a record conveyor mounted on the respective supports and movable past said station, said conveyor being provided with record means hingedly movable outwardly from a predetermined nested position respecting the conveyor, a conveyor actuator for propelling said conveyor from one of said supports toward the other past said station, and light controlled means at said station positioned to be affected by a record hingedly displaced from nested position for preventing the operation of said actuator except when the records are properly nested respecting said conveyor.

7. In a device of the character described, the combination with means providing a record display station, of spaced supports at either side of said station, a record conveyor mounted on the respective supports and movable past said station, said conveyor being provided with record means hingedly movable outwardly from a predetermined nested position respecting the conveyor, a conveyor actuator for propelling said conveyor from one of said supports toward the other past said station, and means at said station for preventing the operation of said actuator except when the records are properly nested respecting said conveyor, said last mentioned means comprising a light source at one side of said station, a light responsive device at the other side of said station, and mechanism subject to the control of said light responsive device for regulating the operation of said actuator, the outward hinged movement of the record means with respect to the conveyor being adapted to intercept light between the light source and the responsive device, such light being not intercepted when the records are properly nested in said positions.

8. A device of the character described comprising the combination with spaced supports and a record mounting conveyor operable therebetween, of a conveyor actuator adapted to move said conveyor and its associated records past an inspection station between said supports, a source of light at one side of said station, a photo-electric cell at the other side of said station, and means controlled by said cell for regulating the operation of said actuator to preclude such operation when the passage of light from said source to said cell is interrupted, said conveyor having record mounts movable upwardly from said conveyor from a nested position in which said mounts are remote from the path of light between said source and cell to a raised position in which said mounts intercept light between said source and said cell, whereby said actuator is inoperative when said mounts are raised.

9. Filing apparatus comprising a series of trays of elongated form having flexible bottoms and flexible upstanding side walls, and means connecting said trays end to end to constitute a conveyor, said means comprising tension elements embedded in the material of said trays and extending continuously longitudinally of the respective trays and operatively connected from tray to tray in tension transmitting relation to each other, whereby substantially to relieve the flexible portions of said trays from tension, storage means for the conveyor including at least one drum upon which the conveyor is wound, and record files in the individual trays for winding therewith upon the drum.

10. Filing apparatus comprising a series of trays of elongated form having flexible bottoms and flexible upstanding side walls, and means connecting said trays end to end to constitute a conveyor, said means comprising tension elements embedded in the material of said trays and extending continuously longitudinally of the respective trays and operatively connected from tray to tray in tension transmitting relation to each other, whereby substantially to relieve the flexible portions of said trays from tension, the trays having longitudinal openings in which said elements are disposed free of connection with the trays intermediate the ends thereof.

11. Filing apparatus comprising a series of trays of elongated form having flexible bottoms and flexible upstanding side walls, and means connecting said trays end to end to constitute a conveyor, said means comprising tension elements embedded in the material of said trays and extending continuously longitudinally of the respective trays and operatively connected from tray to tray in tension transmitting relation to each other, whereby substantially to relieve the flexible portions of said trays from tension, the several trays and the tension elements extending therethrough being perforated at intervals to receive sprocket teeth traversed by the conveyor.

12. Filing apparatus comprising the combination with a shallow tray of elongated form provided with flexible sides having longitudinally extending under-cut slots, of a series of record card supports disposed transversely of the tray and having their respective ends engaged in the slots of the tray sides, said sides having sufficient flexibility to permit of the insertion and withdrawal of said supports without materially bending the supports.

13. The device of claim 12 in combination with record means pivoted to the respective supports for hinged movement into and from nested relation in the tray.

14. Filing apparatus comprising a series of shallow trays connected as a conveyor and provided with upstanding flexible side walls having longitudinally extending under-cut slots, of record means nested in the respective trays, drum means to which the ends of said conveyor are connected and upon which alternatively said conveyor may be wound, supports for said records engaged in the slots of the sides of the respective trays, the flexibility of said sides facilitating insertion and withdrawal thereof, and means for normally holding said record means nested in the respective trays during the retention thereof and the winding thereof to and from said drums.

15. A device of the character described, comprising the combination with a pair of supports and a conveyor operable thereover and extending therebetween, of record carrying means mounted on said conveyor in lapping relation, protecting means normally holding said record carrying means in lapped relation to each other upon said conveyor, mechanism for withdrawing said protecting means in advance of a predetermined station between said supports, mechanism for actuating said conveyor past said station from one of said supports to the other, and control mechanism operatively connected with the actuating mechanism and including means for interrupting the conveyor movement when a predetermined portion of said conveyor arrives at said station.

16. In a device of the character described, the combination with a pair of supports and a conveyor operable between said supports, said conveyor having means for mounting records, a cooperating apron ply superimposed upon the conveyor and constituting means for holding thereto the records mounted thereon, means for actuating said conveyor from one of said supports to the other and for concurrently actuating said apron ply, control means for interrupting the actuation of said conveyor and apron ply when a predetermined portion of said apron ply reaches a predetermined point intermediate said supports, and means for guiding said apron ply upon a path different from that of the conveyor adjacent said point, whereby to expose beyond said point records mounted on said conveyor.

17. In a device of the character described, the combination with means providing a display station and a plurality of record conveyor supports, a record mounting conveyor operable over said supports past said station, overlapping records mounted on the conveyor and adapted to pass therewith to and from the respective supports, apron ply means provided with guides for movement of said apron ply means with the conveyor over the respective supports in record confining relation to the conveyor, means for actuating the conveyor and the apron ply means in unison, and control mechanism including a selector for stopping a predetermined portion of said conveyor at said station for the display of the records mounted thereon, said guides for said apron ply means defining paths for said means diverging from the path of the conveyor in advance of said station to permit access to said records at the station.

18. A record file comprising a tray having a flexible bottom and flexible sides extending from said bottom and sufficiently flexible in a vertical plane to permit said tray to be wound about a reel when assembled with other like trays as a conveyor, said tray being open from side to side and the respective sides having faces at least approximately flat except adjacent the bottom of the tray, each face being there provided with an abruptly undercut shoulder above which the face of the tray side extends substantially unbroken for a distance greatly exceeding the height of said shoulder from the tray bottom.

19. A record file comprising a shallow tray of elongated form having flexible bottom and sides and provided with end walls at its ends, said tray being continuously open between its sides and its end walls, the sides having longitudinally extending slots providing sharply undercut shoulders closely adjacent the bottom of the tray above which said sides extend unbroken and at least approximately flat and approximately parallel for a distance greatly exceeding the distance of the respective shoulders from the bottom of the tray.

20. Filing apparatus comprising the combination with a shallow tray of elongated form provided with flexible sides having longitudinally extending undercut slots, of a series of record means, supports disposed transversely of the tray and having their respective ends engaged in the slots of the tray sides, said sides having sufficient flexibility to permit of the insertion and withdrawal of said supports and extending above the slots sufficiently to receive lapping record means individually connected with the respective supports and nested within the tray and between the sides thereof, said sides laterally confining the record means.

21. Filing apparatus comprising the combination with a set of record supports, of record carriers pivoted to the respective supports and nested in mutually lapping relation, and a shallow tray having sides in lateral confining relation to the nested record carriers and provided adjacent the bottom of the tray with slots in which the ends of the respective supports are releasably engaged, said sides having sufficient flexibility to permit of the insertion and withdrawal of supports without materially flexing the supports or the record carriers mounted thereon.

22. Filing apparatus comprising the combination with a tray having a bottom and flexible sides, said sides having longitudinally extending undercut slots adjacent the bottom adapted to receive the ends of record card supports and being sufficiently flexible to admit and release said supports without materially bending the supports, the sides being extended above the slots sufficiently to provide means for laterally confining cards nested therebetween in connection with the respective supports and in mutually lapping relation.

23. In a device of the character described, the combination with means defining a display station, of a record bearing web, a reel to which said web is connected to be wound on the reel and unwound therefrom, a co-operating apron interposed between successive plies of the web upon the reel to be concurrently wound thereon and unwound therefrom, means for guiding the web past the display station, means for supporting that portion of the web withdrawn from the reel, means for withdrawing the co-operating apron from the web between the reel and the display station, and a separate means for guiding the apron whereby to display the web at said station.

24. The combination with means defining a display station and web guiding means for guiding a web past said station, of first and second web supports comprising a pair of reels, a record-bearing web extending from one of said reels to the other past said station, means for actuating one of said reels to draw the web onto the actuated reel from the other of said reels, and a co-operating apron interwound with the web upon the other reel, and means for guiding said apron upon a path divergent from the path of said web whereby said web is exposed at said station.

25. Filing apparatus comprising a series of flexible trays having bottoms and upstanding sides and ends and connected end to end to constitute a conveyor, together with record sheets in lapping relation in at least one of said trays, the upstanding sides of the tray protecting the sides of the lapping sheets from exposure, and the tray being provided with retaining means for holding such sheets in the tray during conveyor movement.

26. In a device of the character described, the combination with a pair of conveyor supports and a record mounting conveyor mounted on the respective supports, said conveyor being provided with means for the pivotal support of overlapping records, of means for propelling said conveyor between said supports, and light controlled means positioned to be affected by a record displaced about its support for preventing the operation of said conveyor propelling means when a record carried by said conveyor is displaced between said supports.

JEROME L. CLOUGH.